United States Patent [19]

Berthold et al.

[11] Patent Number: 4,843,234

[45] Date of Patent: Jun. 27, 1989

[54] CONSUMABLE ELECTRODE LENGTH MONITOR BASED ON OPTICAL TIME DOMAIN REFLECTOMETRY

[75] Inventors: John W. Berthold, Salem; H. Randy Carter, Alliance, both of Ohio

[73] Assignee: The Babcock & Wilcox Company, New Orleans, La.

[21] Appl. No.: 177,751

[22] Filed: Apr. 5, 1988

[51] Int. Cl.[4] .......................... H01J 5/16; H01J 40/14
[52] U.S. Cl. .................................. 250/227; 350/96.10
[58] Field of Search .............. 250/227, 231 R, 231 P; 358/107, 160; 219/130.01; 356/73.1; 350/96.10, 96.15

[56] References Cited

U.S. PATENT DOCUMENTS

| | | | |
|---|---|---|---|
| 4,289,398 | 9/1981 | Robichaud | 356/73.1 |
| 4,407,561 | 10/1988 | Wysocki | 350/96.3 |
| 4,592,932 | 6/1986 | Biswas et al. | 427/163 |
| 4,621,896 | 11/1986 | Logakos et al. | 350/96.3 |
| 4,733,933 | 3/1988 | Pikulski | 350/96.20 |

Primary Examiner—David C. Nelms
Assistant Examiner—William L. Oen
Attorney, Agent, or Firm—Vytas R. Matas; Robert J. Edwards; Daniel S. Kalka

[57] ABSTRACT

An apparatus and method for measuring the tip location of a consumable electrode in an electric arc furnace employing an optical fiber with high temperature capability and an optical time domain reflectometer.

12 Claims, 3 Drawing Sheets

CONSUMABLE ELECTRODE LENGTH MONITOR BASED ON OPTICAL TIME DOMAIN REFLECTOMETRY

BACKGROUND OF THE INVENTION

1. Field of the Invention

The present invention relates generally to measuring the consumable electrode length in an electric arc melting furnace. More particularly, it relates to measurement of the tip location of a consumable electrode using fiber optic technology.

2. DESCRIPTION OF THE RELATED ART

In the steel industry, measurement of the length of the consumable electrode in electric arc furnaces is necessary to ensure minimum energy, material losses, and prevent shortout in the hot metal. In a submersible arc application, the time of a consumable electrode is immersed in a pile of ore at some predetermined point. There is an arc produced which forms molten metal that flows out of the furnace through a slanted bottom or some regulated draining system that is well known in the art. It is important to know the exact tip location of the consumable electrode for optimal production.

To obtain the best results when using an arc operating device such as an arc furnace, or an arc welder it is imperative that the distance between the elements of the machine between which the arc forms is adjusted and controlled.

In the application at hand, it is compulsory to maintain the length of the arc at its optimal value by controlling the distance between the electrode and the molten metal especially when the electrode is continuously moving due to erosion of its tip.

Some methods require a manual "dipstick" or "sounding" measurement which are inefficient and non-continuous. However, process modeling requires a continuous input of the location of the electrode tip for process optimization. This position information is used not only to readjust tip location but to control, for example, the feed rate of fresh minerals and drain rate of molten metal. Inputs which are provided to the process model based on the infrequent manual soundings, and a prior knowledge of electrode consumption rates, are known to have inaccuracies and cumulative errors.

There have been many attempts in the prior art to find a way to accurately and precisely control and measure the position of the consumable electrode as it is being consumed in the furnace. Most of these attempts focus on the use of arc voltage or some electrical phenomenon generated from the arc voltage such as "hash" and "drop short" phenomena. One such reference, U.S. Pat. No. 4,303,797 employs a mathematical model based on electrode drive speed and voltage discontinuities to control the gap between the bottom of an electrode and the top surface of an ingot. A similar approach was used by Kjolseth, et al (U.S. Pat. No. 3,375,318) by employing the derivative of change in resistance with respect to the electrode position as determined for the location of the electrode point. Both of these references teach the use of some electric variable for setting up a mathematical model for controlling the position of a consumable electrode. Likewise, U.S. Pat. No. 3,187,078 teaches of using voltage discontinuities in a servo system for controlling the arc gap and U.S. Pat. No. 4,578,795 discloses a process for monitoring the gap voltage between the consumable electrode and the molten metal by monitoring the occurrence of drop shorts.

The problem with these approaches is the difficulty of precise control due to the electrical noise. The problems encountered using an electrical approach are discussed in the previously cited references.

Even earlier approaches to monitoring the length of a consumable electrode included a signaling device consisting of a wire extending from a reel to the electrode. When the electrode is consumed up to the wire, the connection is broken causing the lamp, to which the wire is also connected, to go out. This signals the operator that the melting has progressed to the predetermined point. A slightly different approach in U.S. Pat. No. 3,379,818 used the weight of the remaining electrode as a signaling device.

A more recent attempt for controlling the length of an electrical arc in an arc generating machine employed acoustical signals in U.S. Pat. No. 4,435,631. This reference teaches that the acoustical signal generated by an arc is a function of the length of its column which can be compared to a reference signal. It also teaches to modulate the arc column supplying current, for a DC current, to generate an acoustical signal. This reference points out several drawbacks with the prior art for measuring arc voltage drop via an electrical voltage probe. The first drawback is that the electrical voltage probe is never electrically insulated from the arc power supply. This poses noise and drift problems when the arc generating machine is operating at high voltage or when the arc supplying current is floating. A second drawback is that the measuring loop is subject to parasitic voltages induced in the loop when the arc current undergoes large variation.

This reference also teaches of the difficulty of obtaining an exact value of the arc voltage drop. It teaches that it is almost impossible to isolate the arc column voltage drop from the value obtained with the measuring loop.

The disadvantages of employing an electrical approach for control extend to an acoustic approach that uses magnetostrictive wire. Since electrically conductive wire must extend down to the electrical arc, there is still the presence of electrical noise. Likewise, the acoustic time-of-flight depends on wire temperature, which is unlike the present invention. Finally, distance, resolution and precision depend on pulse width. Optical pulses can be produced with picosecond width, while acoustic pulses cannot. To use acoustical signals in both AC and DC applications, additional equipment is required.

There is a need for an apparatus and method for measuring the length of a consumable electrode which has electrical noise immunity. There is also a need for an apparatus that provides an electrically noise-free link to the electrically hostile arc furnace.

Optical fiber length measurement using an optical time domain reflectometer (OTDR) is a method used primarily for fault or break location such as taught in U.S. Pat. No. 4,289,398, which is hereby incorporated by reference. It has not been suggested before to apply this technology to a consumable electrode tip measurement.

SUMMARY OF THE INVENTION

The present invention provides a new method and apparatus for measurement of a consumable electrode's tip location to verify that the tip is properly positioned in an electric arc furnace. At least one optical fiber of a known length is introduced into the consumable electrode. As the consumable electrode is melted in the furnace, the optical fiber is melted therewith. The change in the length of the optical fiber is measured and from those measurements the length of the consumable electrode is calculated which is then used to determine the tip location of the electrode. Optical fiber technology permits measuring the flight of a light pulse which originates at the fiber's input end and then is reflected back from the melted fiber end which corresponds to the end of the consumable electrode.

Advantageously, a second optical fiber, or even a plurality of fibers, with a known length may also be introduced into the consumable electrode for the purpose of instantly verifying the length of the electrode. By cutting one of the optical fibers, the instantaneous change in length of the cut fiber is equal to the distance between the fiber tip (at the electrode tip) and the point at which it is cut.

Accordingly, one aspect of the present invention is to provide a means for controlling and measuring the length of a consumable electrode which is immune to electrical noise.

Another aspect of the present invention is to provide a method for accurately and precisely determining the tip position of a consumable electrode in electric arc furnaces.

Advantageously, the foregoing aspects are achieved with an optical fiber having high temperature capability which lends certainty that the optical fiber reaches the tip of the consumable electrode.

The various features of novelty which characterize the invention are pointed out with particularity in the claims annexed to and forming part of this disclosure. For a better understanding of the present invention, and the operating advantages attained by its use, reference is made to the accompanying drawings and descriptive matter in which a preferred embodiment of the invention is illustrated.

DESCRIPTION OF THE PREFERRED EMBODIMENT

Figure 1:
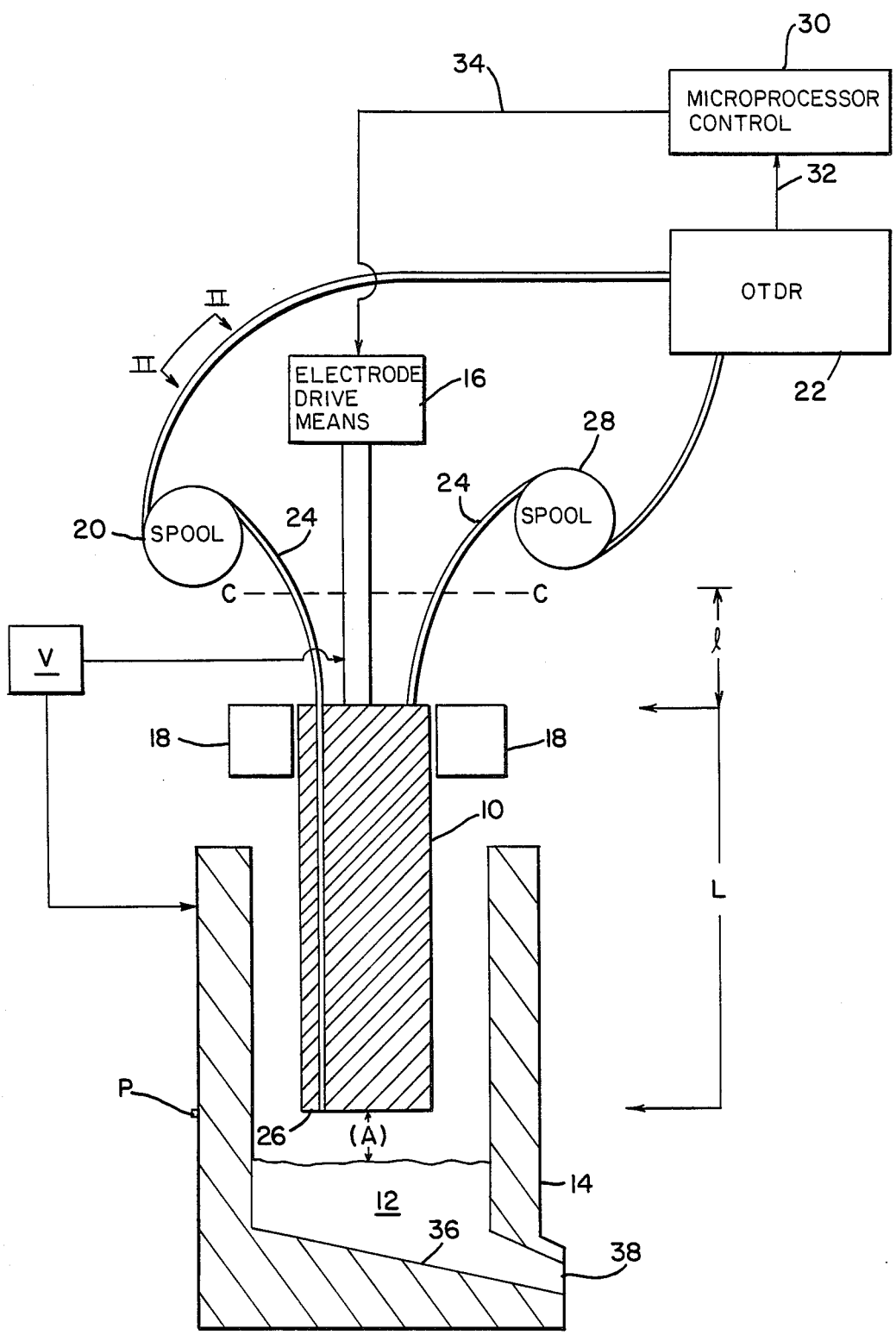
FIG. 1 is a schematic cross-sectional view of a consumable electrode furnace including a block diagram of the components of the preferred embodiment of the present invention.

The operation of a consumable electrode furnace is a dynamic process. FIG. 1 illustrates schematically the major components of a consumable electrode furnace with some of the advantages of the present invention. The electrode 10 is being consumed as it is being lowered to compensate for its erosion or consumption. The molten metal 12 is being formed within some type of crucible or furnace 14. The rate at which the surface of the molten metal 12 rises affects the speed at which the electrode 10 is lowered. As is known in the art, some means for draining the molten metal is necessary so as to keep the electrode tip optimally located at some fixed relative external point, P. This conventional draining system is designated by the slanted bottom 36 in furnace 14 with a drain 38. The electrode drive means 16 is operated by some motor control which is conventional to the art of electric arc furnaces. The furnace 14 and the rate for controlling the level of the molten metal 12 are all known in the art. The focus of the prior art has been on adjusting the electrode drive means 16 so that it adjusts the electrode 10 feed rate to maintain some constant arc length as is depicted by the (A) with the arrow showing the arc length in FIG. 1. Arc, (A), is produced from power source V which connects electrode 10 to the molten metal 12. This arc length (A) can be determined from the length of the consumable electrode relative to some external reference point, P, in the melting furnace.

Alternatively, in a submersible arc application, ore is piled around the tip of the electrode while the molten metal is continually drained from the bottom. As the tip of the electrode 10 is being consumed, it is imperative that the tip's location is known so that the electrode drive speed is at the proper rate. This tip position information can be used not only to readjust tip location of the electrode 10 but to control, for example, the feed rate of fresh minerals or ore and drain rate of molten metal 12. Currently, input is provided to the process model based on the infrequent manual soundings and the prior knowledge of electrode consumption rates. These methods are known to have inaccuracies, and cumulative errors arise from assumed consumption rates.

Since the electrodes are continually consumed in the electric arc furnace, these electrodes must be continually regenerated. Preferably, the electrode is graphite. Ordinarily, regeneration is done outside the furnace. For example, a graphite consumable electrode is continually molded as it is being consumed in the furnace. A carbon filled epoxy is placed into a mold which is designated as 18 in FIG. 1 at the top of the electrode 10 above the furnace 14. The epoxy hardens as the electrode 10 is continuously lowered into the furnace 14 by the electrode drive means 16 which maintains a proper tip depth. A spool of optical fiber of a known length 20 is located above the electrode 10 and is connected to an optical time domain reflectometer (OTDR) 22. The encased optical fiber 24 from the spool 20 is introduced into the carbon epoxy at the top of the mold 18 for electrode regeneration. When the tip of the fiber 24 reaches the tip of the electrode 26, the fiber melts away as does the electrode tip 26. By measuring the rate of change of fiber length the burn rate of the electrode is determined.

If a second spool of optical fiber 28 is located above the electrode 10 as shown in FIG. 1, the electrode tip position 26 may be instantaneously verified periodically by cutting one of the fibers 24 from either spool 20 or 28. The instantaneous change in length of the cut fiber is equal to the distance between the fiber tip (at the electrode tip 26) and the point at which it was cut designated as C in FIG. 1.

For example, the following formulas are used in the calculations:

$$L(t) = L(t_F) + [F_j(t_F) - F_j(t)] - S[t_F - t] \qquad (1)$$

$$L(t_F) = f_j(t_b) - F_j(t_F) - 1 \qquad (2)$$

where:

L(t) = desired electrode length as a function of time

Fn(t) = measured length of optical Fiber 24 from spool 20 (n=1) or spool 28 (n=2)

n = $i,j; i \neq j$

S = known electrode drive speed (length per unit time).

Fn($t_b$) = measured length of optical Fiber 24 from spool 20 or 28 just before cutting at time $t_b$ Fn($t_F$) = measured length of optical Fiber 24 from spool 20 or 28 just after cutting at time $t_F$ L($t_F$) = measured electrode length just after cutting of optical Fiber 24 l = known distance between point C and top of electrode, as shown in FIG. 1

It is known in the art that the OTDR 22 converts time of flight of a light pulse to distance which is used for the above-mentioned calculations. The data from the OTDR 22 is input into the microprocessor control 30 through transmission line 32. The microprocessor 30 employs this data to direct through line 34 the electrode drive means 16 motor control to maintain the proper tip location of the electrode 10 relative to the external reference point P.

Due to the high temperature present at the time of the electrode 10, there are problems with using optical fibers which have a plastic buffer coating. There is uncertainty whether the fiber actually reaches the tip of the electrode 26, because the plastic coating readily melts. A basic assumption of the present invention is that the encased optical fiber 24 and the electrode 10 are consumed at the same rate.

There exists a metal buffer coating for optical fibers which is commercially available from Hughes Aircraft, for example. The coating is an aluminum buffer coating. It is preferable to use this type of optical fiber since it does not readily melt like the plastic coating.

Figure 2:
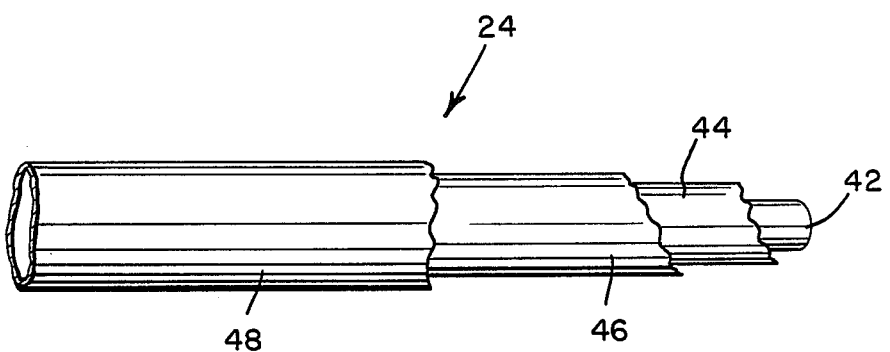
FIG. 2 is a perspective view of an encased optical fiber with portions removed taken from II—II in FIG. 1.

The metal buffer coated optical fiber is not available as a cable which can be wound on a spool. Therefore, it has been found that to improve the mechanical strength of a metal buffer coated optical fiber, a thin-walled tube is swaged about the fiber. FIG. 2 depicts an optical fiber 24 with a silica core 42, a doped silica cladding 44, and a metal buffer coating 46. The optical fiber is inserted and threaded through a thin-waled tube 48 such as about a 0.030 inch stainless steel tubing with an internal diameter of about 0.015 inch to form the encased optical fiber 24. An optical fiber has an outer diameter of about 0.010 inch so it fits easily and securely within tube 48. It is readily apparent that the tubing can be composed of any metal as long as it is reasonably high melting with sufficient ductility to wrap on a spool. The tubing 48 is swaged onto the optical fiber. This term of art generally means that the tubing 48 is slightly crimped on the optical fiber so as to retain it securely without crushing it. The soft aluminum coating yields during swaging so that the fiber is prevented from slipping in the tube, yet minimal stress is introduced into the fiber. Alternately, the space between the fiber and tube could be packed with alumina ($Al_2O_3$) powder prior to swaging to minimize thermal expansion induced stresses in the cable assembly.

Advantageously the encased optical fiber 24 now has high temperature capability which ensures the fiber 24 reaching the tip of the electrode 26.

Figure 3:
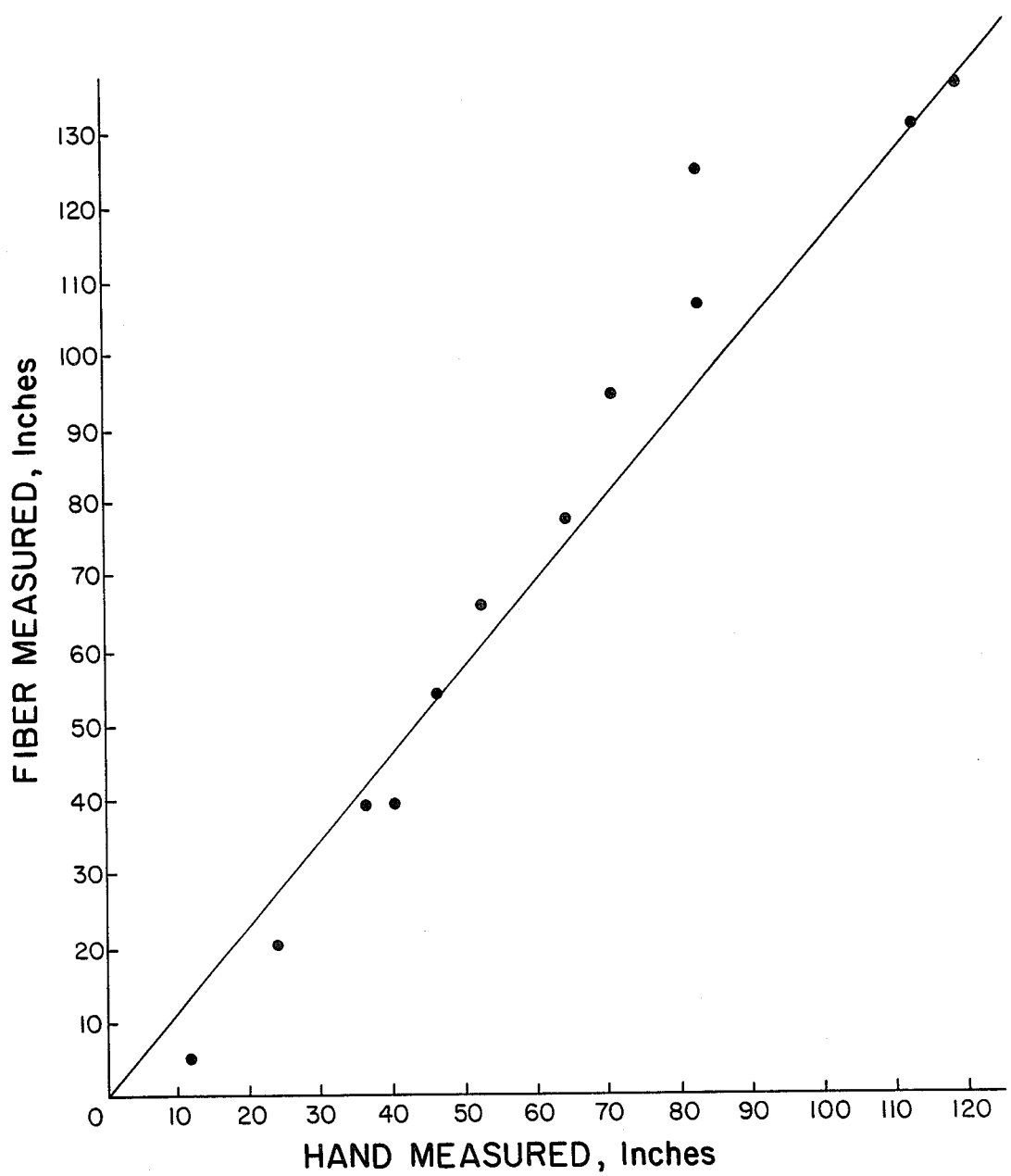
FIG. 3 is a graph illustrating measurements of length using the present invention versus hand measurements of length.

FIG. 3 is a plot of field test data taken on an operating graphite electrode furnace. The graphite electrode contained a hollow pipe to enable sounding measurements to be made down to the molten metal. The horizontal scale or the X-axis represents hand measurements of length as an optical fiber was lowered into the pipe down close to the graphite electrode tip. The vertical scale represents data measured using the OTDR to obtain fiber length as the end of the fiber was vaporized. If the two measurements were always in agreement, the data points would all lie on a 45° line. The relative measurement precision and cumulative error are about 6 inches. This data indicates the feasibility of making real-time measurements of graphite electrode length and tip position in electric arc furnaces. In addition, sounding measurements were made before and after the fiber measurements. The sounding method required measurement of the length of steel cable as an asbestos bob was lowered through the pipe in the graphite electrode. With this method, the repeatability was 43 inches. The advantages of the fiber length measurement are thus real-time capability and improved precision. Another significant advantage is the optical fiber electrical noise immunity. The glass optical fiber is non conducting and thus provides an electrically noise-free link between the electronic OTDR and the electrically hostile electric arc furnace.

While a specific embodiment of the present invention has been shown and described in detail to illustrate the application and principles of the invention, it will be understood that it is not intended that the present invention be limited thereto and that the invention may be embodied otherwise without departing from such principles. For example, while the preferred embodiment has shown only two optical fibers situated in the graphite electrode, it is possible for a plurality of optical fibers to be situated in an electrode for facilitating the verification of the length of the electrode at any point in time. Likewise, even though the preferred embodiment shows a graphite electrode being molded in place, based on the above it is readily apparent that other compositions of the electrode may be molded immediately above the top of the electrode as it is continually being consumed with optical fibers situated therein.

What is claimed is:

1. A method for determining the change in length of a consumable element comprising the steps of:
    introducing an optical fiber having a known length along with the element;
    changing said optical fiber along with a change in the element;
    measuring a change in length of said optical fiber; and
    calculating the change in length of the element from the change in optical fiber length.

2. A method as defined in claim 1, wherein the consumable element is an electrode.

3. A method as defined in claim 2, wherein the consumable electrode is graphite.

4. A method as defined in claim 1, further comprising the step of determining the position of the tip of the element.

5. A method as defined in claim 1, wherein the measuring step includes a means for timing a flight of a light pulse originating at a fiber input end and reflected back from the fiber output end.

6. A method as defined in claim 5, wherein said timing means is an optical time domain reflectometer.

7. A method as defined in claim 1, further comprising the step of introducing at least a second optical fiber having a known length along with the element.

8. A method as defined in claim 7, further comprising the step of verifying the length of the consumable element by cutting one of said optical fibers, the instantaneous change in length of said cut fiber defining the length of the consumable element.

9. In a consumable electrode melting furnace having an electrode, an electrical supply system for melting the electrode, and an electrode drive means for repositioning the electrode as the melt proceeds, the improvement comprising at least one optical fiber having a known length situated in said electrode, and means for timing flight of a light pulse originating at each fiber input end and reflected back from each melted fiber output end.

10. A device as defined in claim 9, wherein said means for timing flight of a light pulse includes an optical time domain reflectometer.

11. A device as defined in claim 10, wherein each of said optical fibers is on a spool located above the consumable electrode.

12. A device as defined in claim 11, further comprising:
a microprocessor control responsive to said optical time domain reflectometer directing the electrode drive means for repositioning the electrode as the melt proceeds.

* * * * *